United States Patent
Hsu et al.

(10) Patent No.: US 6,839,065 B2
(45) Date of Patent: Jan. 4, 2005

(54) METHOD FOR PRODUCING BUMP MAPPING EFFECT FOR A THREE DIMENSIONAL OBJECT OF A COMPUTER GRAPHIC

(75) Inventors: Shu-Fang Hsu, Taipei (TW); Meng-Hua Wu, Taipei (TW)

(73) Assignee: ULEAD Systems, Inc., Taipei (TW)

( * ) Notice: Subject to any disclaimer, the term of this patent is extended or adjusted under 35 U.S.C. 154(b) by 137 days.

(21) Appl. No.: 10/282,119

(22) Filed: Oct. 29, 2002

(65) Prior Publication Data

US 2003/0169273 A1 Sep. 11, 2003

(30) Foreign Application Priority Data

Mar. 7, 2002 (TW) ........................................ 91104258 A

(51) Int. Cl.⁷ ................................................ G09G 5/00
(52) U.S. Cl. .................. 345/584; 345/585; 345/597; 345/598; 345/599; 345/586; 345/587; 345/588; 345/589
(58) Field of Search ................................. 345/584, 585, 345/586, 587, 589, 597, 598, 599

(56) References Cited

U.S. PATENT DOCUMENTS

| | | | | |
|---|---|---|---|---|
| 6,175,368 B1 | * | 1/2001 | Aleksic et al. | 345/582 |
| 6,340,974 B1 | * | 1/2002 | Nagashima | 345/584 |
| 6,429,872 B1 | * | 8/2002 | Ernst | 345/584 |
| 6,654,013 B1 | * | 11/2003 | Malzbender et al. | 345/426 |
| 2002/0030681 A1 | * | 3/2002 | Ritter | 345/426 |

\* cited by examiner

*Primary Examiner*—Matthew C. Bella
*Assistant Examiner*—Manucher Rahmjoo
(74) *Attorney, Agent, or Firm*—Birch, Stewart, Kolasch & Birch, LLP

(57) ABSTRACT

A method is for producing the bump mapping effect for a 3D object in a computer graphic. First, a shading vector is produced at one point of the surface of the 3D object. A shift coordinate with respect to this point is determined, according to the shading vector. According to the shift coordinate, a rotational calculation matrix is set up. Then, a diffuse color value with respect to this point is computed, which is equal to the difference between an adjacent rotation color value to this point and an averaged color value, wherein the averaged color value is defined as the sum and average of the color channels for R, G, and B with respect to this point, and the adjacent rotation color value is defined as a sum of the averaged color value with respect to a number of the adjacent points and the coefficient product with respect to the adjacent points in the rotational calculation matrix. Then, the emboss image value at this point is computed. The color channels of R, G, and B of the emboss image value are respectively equal to the product of the color channels of R, G, and B at this point being subtracted by the diffuse color value and the coefficient of the emboss effect. By repeating the foregoing steps, the emboss image value at each point of the surface of the 3D object is computed.

8 Claims, 2 Drawing Sheets

METHOD FOR PRODUCING BUMP MAPPING EFFECT FOR A THREE DIMENSIONAL OBJECT OF A COMPUTER GRAPHIC

This application incorporates by reference of Taiwan application Serial No. 091104258, filed Mar. 7, 2002.

BACKGROUND OF THE INVENTION

1. Field of the Invention

This invention relates to a method for producing a bump mapping effect for a three dimensional (3D) object of the computer graphic, and more particularly, the invention relates to method for producing a bump mapping effect for a 3D object of the computer graphic by using the embossing function.

2. Description of Related Art

In the field of computer graphic technology, the ability to generate a textured outer appearance of a 3D object for the computer graphics has been a very important issue. Currently, the technology for bump mapping is often used to increase the detail of the surface of the 3D object. The surface model for the 3D object of the graphic usually is composed of a number of polygons, for example, so as to produce the vein by the uneven bright and dark level. The 3D object can be viewed to have a wrinkled or uneven surface. However, this technology requires the computation of each point on the surface of the 3D object, in order to obtain the information of the normal vector in variation. For the product with the function for processing the 3D computer graphics, the technique is complicated and requires much processing time.

Alternatively, there is another method of applying the technology used for processing the 2D image in the process of the 3D computer graphic, such as, the emboss function technology. The technology of the embossing function is applied by changing the texture sample and wrapping it on the surface of the 3D object. Even though it is not directly applied on the model of the 3D object, it still can achieve the same visual effect. As to this property, the special interest group on computer graphics (SIGGRAPH) has been proposed in 1998 to diffuse the bump mapping technology. This technology is applied by wrapping the texture sample onto the surface of a 3D object. This is the first image. The surface of the object is composed of a number of polygons for simulation in display. Then, the normal vector, the tangent vector, and the binormal vector for each end point of the polygon are computed. After that, the foregoing three vectors are used to produce a rotation matrix, and the light source vector is rotated to the tangent space via the rotation matrix. Then, the vector components on the X-Y plane of the light source vector after being rotated are treated as the shift coordinates with respect to the end points, and then the end points are shifted. The shift coordinate for the point within the polygon is computed by an interpolation method, according to each of the end points. In this manner, the shift coordinate for all of the points can be computed a new polygon is then produced. All of the polygons are shifted by repeating the foregoing processing step, and then a second image is produced. Next, the image value of the second image is subtracted by the image value of the first image, and thus an image with the embossing effect is obtained.

However, the foregoing conventional method has the following disadvantages:

(1) It is easy to produce the discontinuous surface texture. In regard to the foregoing method, the tangent vector for each of the end points is used to determine the shift coordinate. If the object has a curved or a steep surface, the relative variation for the tangent vector is very large, and this will cause the phenomenon of a discontinuous or broken surface when the embossed image from the computed results is wrapped onto the surface of the 3D object.

(2) It is complicated. In the foregoing method, each point needs to be computed to obtain the respective shift coordinate. The computation is tedious and time-consuming.

SUMMARY OF THE INVENTION

It is therefore an objective of the present invention to provide a method for producing the bump mapping effect for a 3D object in a computer graphic. The method is to provide an embossed image in a fast process, capable of preventing the broken surface and noise points from occurring.

In accordance with the foregoing and other objectives of the present invention, the invention provides a method for producing the bump mapping effect for a 3D object in a computer graphic. The method is applied on a 3D object in a computer graphic. First, a shading vector is produced at one point of the surface of the 3D object. The shading vector can be the normal vector at this point or the cross product of the light source vector and the normal vector. Then, a shift coordinate with respect to this point is determined, in which the shift coordinate is equal to the product of the components of the shading vector on the X-Y plane and the coefficient of the emboss radius. After that, a rotational calculation matrix is set up. This rotational calculation matrix includes a number of coefficient quantities of the matrix, and the coefficient quantities of the matrix are determined by the shift coordinate. Next, a diffuse color value with respect to this point is computed. The diffuse color value is equal to the difference between an adjacent rotation color value to this point and an averaged color value, wherein the averaged color value is defined as the sum and average of the color channels for R, G, and B with respect to this point. The adjacent rotation color value is defined as a sum of the averaged color value with respect to a number of the adjacent points and the coefficient product with respect to the adjacent points in the rotational calculation matrix. Then, the emboss image value for this point is computed. The color channels of R, G, and B of the emboss image value are respectively equal to the products of the color channels of R, G, and B for this point being subtracted by the diff-use color value and the coefficient of the emboss effect. By repeating the foregoing steps, the emboss image value at each point of the surface of the 3D object is computed.

BRIEF DESCRIPTION OF DRAWINGS

The invention can be more fully understood by reading the following detailed description of the preferred embodiments, with reference made to the accompanying drawings, wherein.

DETAILED DESCRIPTION OF PREFERRED EMBODIMENTS

The method of the present invention for forming the bump mapping effect on the 3D object of the computer graphics uses the embossing function to achieve the bump mapping effect. As a result, the surface of the 3D object of the computer graphics can have the appearance of a 3D view effect. The principle in the present invention is processing the texture of the samples in accordance with the property of the 3D object surface. After that, an image with the embossing effect is produced. Then, the image with the embossing effect is wrapped to the 3D object surface. The present invention uses a shading vector of the 3D object surface, so as to determine the shift coordinate of the embossing function for the image. The shading vector can be the normal vector of the 3D object surface or the cross product of the light source vector and the normal vector. The present invention further considers the image value for the adjacent points, so as to prevent the excessive color difference of the adjacent points in the image, which would result in the defect of a discontinuity in the image.

Figure 1:
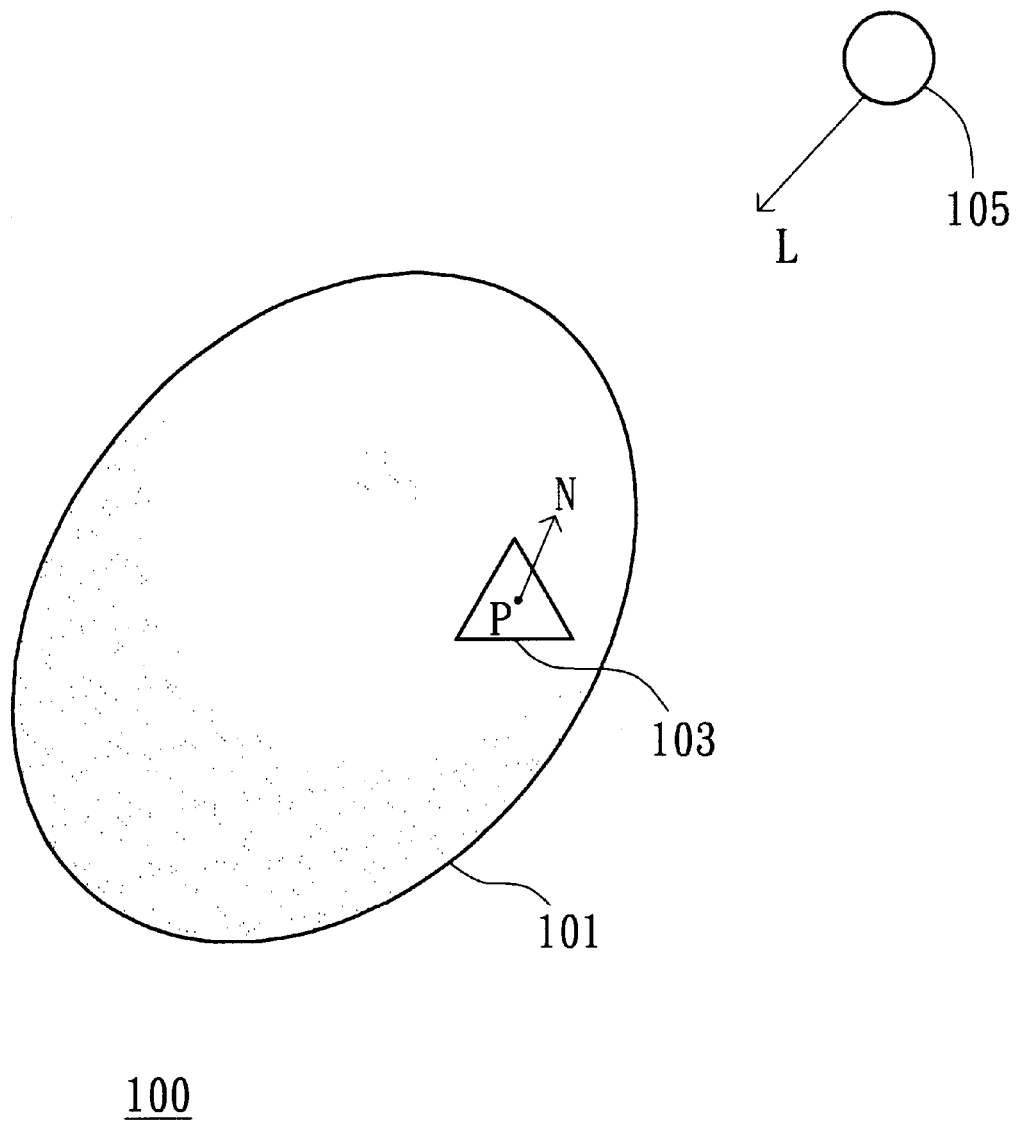
FIG. 1 is a drawing, schematically illustrating a computer graphic with the 3D object.

Referring to FIG. 1, it is a drawing schematically illustrating a computer graphic 100 with the 3D object 101. As shown in FIG. 1, the computer graphic 100 has a 3D object 101 with a texture. In order to make use of the method of the present invention, the surface of the 3D object 101 is cut into a number of polygons with proper size (not shown in the drawing), and these polygons are used to represent the surface of the 3D object 101.

Figure 2:
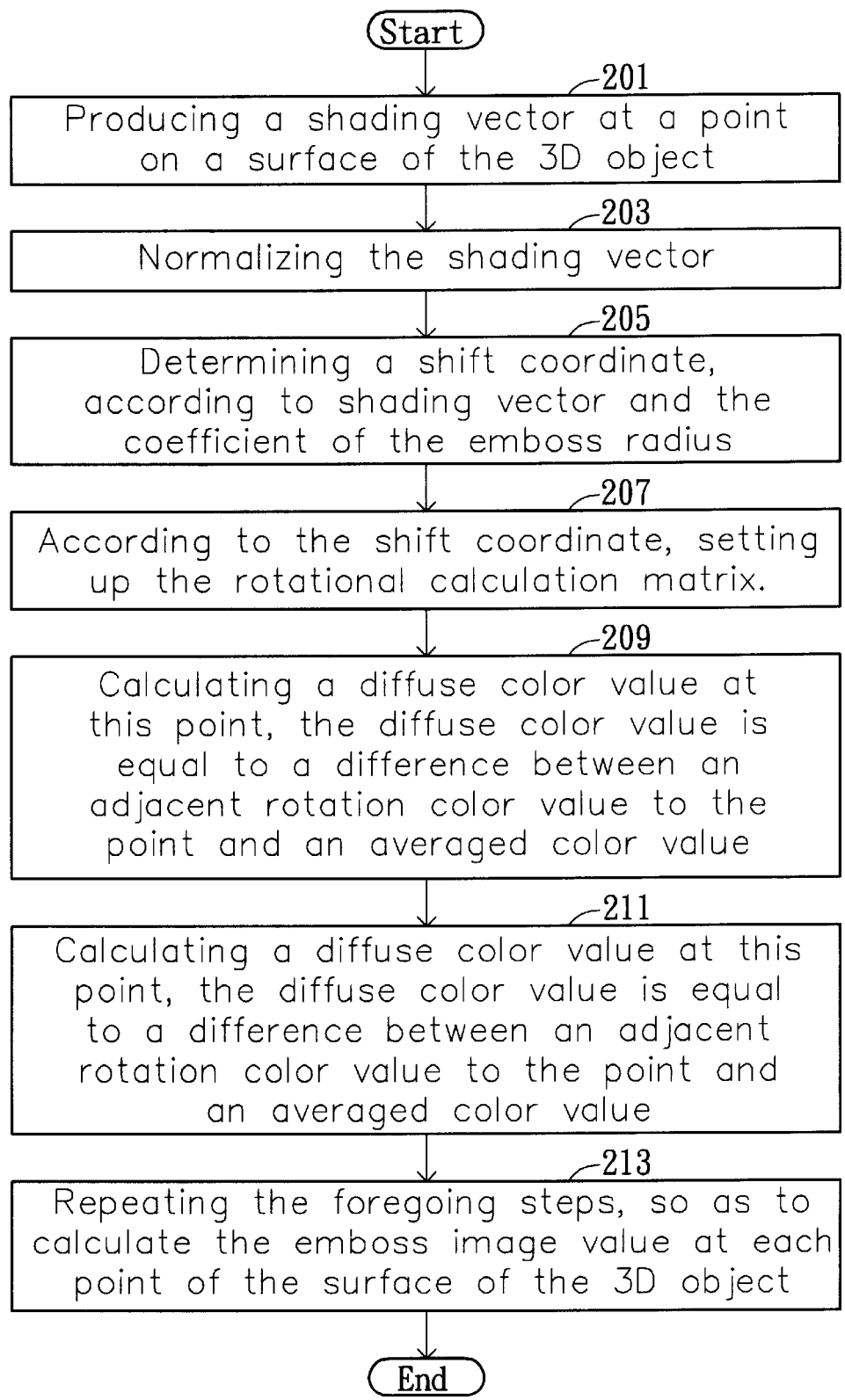
FIG. 2 is a drawing, schematically illustrating the process flow to form the bump mapping effect for the computer graphic with 3D object, according to a preferred embodiment of the present invention.

Then, referring to FIG. 2, it is a drawing schematically illustrating the process flow diagram to form the bump mapping effect for the computer graphic with 3D object, according to a preferred embodiment of the present invention. As shown in FIG. 2, the first step 201 of the method of the present invention is to set the shading vector of one point P of the polygon 103 of the surface of the 3D object 101. The shading vector is used to determine the shift coordinate for the embossing function with respect to the image, i.e. the shading direction for embossing on the image can be determined. Therefore, in this step 201, the shading vector of the point P is the normal vector N or the cross product of the light source vector L and the normal vector N of the point P. In the present invention, the normal vector N at the point P is defined as the normal vector N of the polygon on which the point P is located. In other words, for any point in the polygon 103, the normal vector is the normal vector N with respect to the polygon. This advantage allows the calculation speed in the present invention to be improved. Also, the phenomenon of the broken surface (i.e. the discontinuous surface) can be avoided.

Then, in the step 203, the shading vector is normalized, so as to obtain the vector length of one unit for the shading vector. Then, the step 205 is performed. In the step 205, a shift coordinate at the point P is determined. This shift coordinate is equal to a product of the components of the shading vector located on the X-Y plane and the coefficient of the emboss radius. The coefficient of the emboss radius represents the shift amount of the image emboss effect or the radius of the image emboss effect. Next, the step 207 is performed.

In the step 207, a rotational calculation matrix is set up, in which the rotational calculation matrix is used for calculating the image with the emboss effect. This rotational calculation matrix has a number of matrix coefficient values and these matrix coefficients values are determined by the shift coordinate. For example, the rotational calculation matrix can be a two dimensional matrix and the shift coordinate, for example, has the format of (dOffx, dOffy). In this manner, the coefficients (w00, w01, w10, w11) of the rotational calculation matrix can be (1-w01-w10-w11, (⌈dOffx⌉-dOffx)* (dOffy-⌊dOffy⌋), (dOffx-⌊dOffx⌋) *(⌈dOffy⌉-dOffy), (dOffy-⌊dOffy⌋) *(dOffx-⌊dOffx⌋)), in which the sum of w00, w01, w10, and w11 is equal to 1.

Then, in the step 209, a diffuse color value of dDiffColor at the point P is calculated. This diff-use color value of dDiffColor is equal to a difference between a rotational color value of dCon with respect to the adjacent point and an averaged color value of dSum. The averaged color value at the point P is an average of the channels of R, G, and B, as determined by the equation:

$$d\text{Sum}=(Ir(x,y)+Ig(x,y)+Ib(x,y))/3,$$

in which I(x,y) represents the image value of the point P with respect to the texture sample at the point (x,y), and Ir, Ig, and Ib respectively represent the color values of R, G, and B channels. The rotational color value of dCon for the adjacent point is equal to a sum of the product of the averaged color value with respect to the point adjacent to the point P and the coefficient of the rotational calculation matrix with respect to the adjacent point, as determined by the equation:

$$d\text{Con}=w00*d\text{Sum}00+w01*d\text{Sum}01+w10*d\text{Sum}10+w11*d\text{Sum}11,$$

in which dSumij represents the averaged color value at the point (x-i, y-j). Thus, the diffuse color value is determined as dDiffColor=dCon−dSum. The effect of this step is to prevent an excessive color difference for the adjacent points in the embossed image from occurring, resulting in the defect of producing the noisy point or the discontinuity.

After that, the step 211 is performed, in which step the emboss image value I'(x,y) at the point P is calculated. Also, the color channel values for R. G, and B of the emboss image value I'(x,y) are respectively equal to the primary color channel values for R. G, and B, which have been subtracted by the product of the diffuse color value of dDiffColor and an emboss coefficient of dEmbossAmount. The emboss coefficient of dEmbossAmount is used to adjust the effect of the shading for the emboss color. The emboss coefficient of dEmbossAmount can be a parameter of light source intensity or a parameter of visual shading, in which the parameter of light source intensity is used to reflect the strength of the light source to the emboss image value and the parameter of visual shading is used to allow the user to directly adjust the depth of the emboss effect. These two parameters both can affect the effect of the embossed image. The emboss image values of I'(x,y) can be expressed by the following:

$I'r(x,y)=Ir(x,y)-d\text{DiffColor}*d\text{EmbossAmount}$, $I'g(x,y)=Ig(x,y)-d\text{DiffColor}*d\text{EmbossAmount}$, and $I'b(x,y)=Ib(x,y)-d\text{DiffColor}*d\text{EmbossAmount}$.

Then, in the step 213, the foregoing steps are repeated, so as to calculate the emboss image value with respect to each point of the surface of the 3D object 101, so as to obtain an embossed texture. Additionally, the embossed image is wrapped to the surface of the object 101. Then, the effect to have the bump mapping effect is accomplished.

In the foregoing embodiment of the present invention, the method for producing a bump effect for a 3D object of the computer graphic is disclosed and has of the following advantages:

(1) The present invention can prevent the broken surface of the surface texture from occurring. In the method of the invention, the shift coordinates for all points within the same polygon of the 3D object surface are calculated by the normal vector of the polygon, so that the phenomenon of a discontinuous or broken surface can be prevented from occurring.

(2) The present invention can prevent the occurrence of the phenomenon of discontinuity due to an excessive color difference from the adjacent points. The method of the present invention considers the image value for the adjacent point as a reference and then calculates the embossed image. In this manner, the noisy points can be prevented from occurring.

(3) The present invention can have a fast calculation speed. In the method of the present invention, it is not necessary to calculate the shift coordinate for each point one by one, so that the calculation speed can be effectively improved.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A method for producing the bump mapping effect for a 3D object in a computer graphic, the method comprising:

producing a shading vector at a point on a surface of the 3D object;

determining a shift coordinate with respect to the point, wherein the shift coordinate is equal to a product of the components of the shading vector on a X-Y plane and a coefficient of an emboss radius;

setting up a rotational calculation matrix, wherein the rotational calculation matrix includes a plurality of coefficient quantities for the matrix, and the coefficient quantities of the matrix are determined by the shift coordinate;

calculating a diffuse color value with respect to the point, wherein the diffuse color value is equal to a difference between an adjacent rotation color value to the point and an averaged color value, wherein the averaged color value is defined as a sum and average of the color channels for R, G, and B with respect to the point, and the adjacent rotation color value is defined as a sum of the averaged color value with respect to a plurality of adjacent points and a coefficient product with respect to the adjacent points in the rotational calculation matrix;

calculating an emboss image value at the point, wherein the color channels of R, G, and B of the emboss image value are respectively equal to a product of the color channels of R, G, and B at the point being subtracted by the diffuse color value, and a coefficient for an emboss effect; and repeating the foregoing steps, so as to calculate the emboss image value at each point of the surface of the 3D object.

2. The method as recited in claim 1, wherein the shading vector includes a normal vector at the point.

3. The method as recited in claim 1, wherein the shading vector is a normal vector of a polygon, on which the point is located.

4. The method as recited in claim 1, wherein the shading vector includes a cross product of a light source vector and a normal vector of a polygon, on which the point is located.

5. The method as recited in claim 1, wherein between the step of producing the shading vector and the step of determining the shift coordinate, the method further comprises the step of:

normalizing the shading vector.

6. The method as recited in claim 1, wherein the shift coordinate is in a format of (dOffx, dOffy), wherein the coefficients (w00, w01, w10, w11) of the rotational calculation matrix can be (1-w01-w10-w11, (⌈dOffx⌉-dOffx)* (dOffy-⌊dOffy⌋), (dOffx-⌊dOffy⌋) *(⌈dOffy⌉dOffy), (dOffy-⌊dOffy⌋) *(dOffx-⌊dOffy⌋)), in which a sum of w00, w01, w10, and w11 is equal to 1.

7. The method as recited in claim 1, wherein the coefficient of the emboss effect is a parameter of visual depth.

8. The method as recited in claim 1, wherein the coefficient of the emboss effect is a parameter of light intensity.

* * * * *